United States Patent
Ikoma

(10) Patent No.: US 6,953,502 B2
(45) Date of Patent: Oct. 11, 2005

(54) INK COMPOSITION FOR WATER-BASED BALL PEN

(75) Inventor: Hideyuki Ikoma, Yokohama (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 201 days.

(21) Appl. No.: 10/312,727

(22) PCT Filed: Jun. 27, 2001

(86) PCT No.: PCT/JP01/05518

§ 371 (c)(1),
(2), (4) Date: Mar. 13, 2003

(87) PCT Pub. No.: WO02/02702

PCT Pub. Date: Jan. 10, 2002

(65) Prior Publication Data

US 2003/0177947 A1 Sep. 25, 2003

(30) Foreign Application Priority Data

Jun. 30, 2000 (JP) ........................................ 2000-199546

(51) Int. Cl.⁷ ........................... C09D 11/18; C09B 67/50
(52) U.S. Cl. ................................... 106/31.78; 106/410
(58) Field of Search .............................. 106/31.78, 410

(56) References Cited

U.S. PATENT DOCUMENTS

| | | | | | |
|---|---|---|---|---|---|
| 4,864,324 A | * | 9/1989 | Shirota et al. | .............. | 347/100 |
| 5,704,969 A | * | 1/1998 | Kanaya et al. | ........... | 106/31.48 |
| 5,759,254 A | * | 6/1998 | Macpherson et al. | ....... | 106/410 |
| 6,562,116 B1 | * | 5/2003 | Satoh | ....................... | 106/31.58 |
| 6,645,284 B2 | * | 11/2003 | Ikoma | ..................... | 106/31.58 |
| 2001/0017096 A1 | * | 8/2001 | Miyamoto et al. | ....... | 106/31.58 |
| 2001/0032567 A1 | * | 10/2001 | Ikoma | ..................... | 106/31.58 |
| 2003/0213408 A1 | * | 11/2003 | Mochizuki et al. | ......... | 106/410 |

FOREIGN PATENT DOCUMENTS

| | | |
|---|---|---|
| DE | 3726848 A1 | 2/1998 |
| JP | 63-280783 A | 11/1988 |
| JP | 6-9916 A | 1/1994 |
| JP | 10-095947 A | 4/1998 |
| JP | 2000-80317 A | 3/2000 |
| WO | 95/29208 A1 | 11/1995 |

* cited by examiner

*Primary Examiner*—Helene Klemanski
(74) *Attorney, Agent, or Firm*—Burns, Doane, Swecker & Mathis, LLP

(57) ABSTRACT

Provided are a navy blue water based ink composition for a ballpoint pen comprising a colorant, water and a dispersant, wherein at least cobalt phthalocyanine blue is used as the colorant, and a pH of the ink falls in a range of 7 to 10, and a ballpoint pen occluding the water based ink composition. Cobalt phthalocyanine blue has preferably a diameter of 500 nm or more and a content of 0.05 to 30% by weight based on the total amount of the ink composition.

40 Claims, No Drawings

INK COMPOSITION FOR WATER-BASED BALL PEN

TECHNICAL FIELD

The present invention relates to a water based ink composition for a ballpoint pen using a navy blue pigment and a ballpoint pen using the same.

BACKGROUND ART

When a water based pigment ink is colored navy blue, it has so far been carried out to use a navy blue colorant or blend a plurality of colorants to prepare a navy blue color. A navy blue colorant includes Prussian blue, cobalt blue (cobalt aluminum oxide: C. I. 77346) and the like, and a blended colorant includes a combination of carbon black and copper phthalocyanine pigment. The latter method of blending colors can be an effective means when a viscosity of an ink in a ballpoint pen is 50 to 1000 mPa·s, but if a viscosity of the ink is 1 to 10 mPa·s, there is a strong possibility of occurring selective precipitation of the colorants and the stability with the passage of time is poor.

Inorganic pigments such as Prussian blue and cobalt blue have a weak coloring power as compared with those of organic pigments, and an inorganic pigment having a poor alkali resistance such as Prussian blue is further reduced in a coloring power particularly when a pH of the ink is set 7 to 10. This requires to increase the blending amount of the pigment in the ink, and as a result, when the ink is filled into an ink tank of a ballpoint pen in which the ink in the ink tank can visually be observed from the outside, a color of the ink in the ink tank which is visually observed from the outside is very different from that of the drawn lines, so that a color of the drawn lines can not be recognized from the apparent ink color.

Further, increasing a blending amount of a pigment in an ink brings about marked tendency to cohere the pigment in storing over a long period of time, and particularly when inorganic pigments are used, the problem that a ballpoint pen tip is worn to a large extent by writing is caused, which leads to a reduction in writing feeling and a writing distance.

Disclosed in Japanese Patent Application Laid-Open No. Hei 10-95947(1998) is an ink containing lithium cobalt titanate in order to make a color of the drawn lines cobalt blue (light blue). However, such inorganic pigment causes an ink to be poor in stability with the passage of time because of the factors as described above and the writing feeling and the writing distance of the ink are lowered, particularly when a viscosity of the ink is 1 to 10 mPa·s.

An object of the present invention is to provide a water based ink composition for a ballpoint pen which makes it possible to visually observe a color of the ink in an ink tank and a color of the drawn lines to be almost the same navy blue color when the ink is filled into a ballpoint pen tank in which the ink in the ink tank can visually be observed from the outside, and which is not changed even in storing over a long period of time and is excellent in lubricity.

DISCLOSURE OF THE INVENTION

In light of the existing situations described above, intensive researches repeated by the present inventors have resulted in finding that the object described above can be achieved by using cobalt phthalocyanine blue as a colorant in a water based navy blue ink, and thus the present invention has come to be completed based on this knowledge.

That is, the present invention suitably comprises the following items (1) to (7).

(1) A water based ink composition for a navy blue ballpoint pen comprising a colorant, water and a dispersant, wherein at least cobalt phthalocyanine blue is used as the colorant, and a pH is controlled to a range of 7 to 10.

(2) The water based ink composition for a ballpoint pen as described in the above item (1), wherein a blending amount of the cobalt phthalocyanine blue is 0.05 to 30% by weight based on the total amount of the composition.

(3) The water based ink composition for a ballpoint pen as described in the above item (1) or (2), wherein a viscosity is 1 to 10 mPa·s (25° C.), and a surface tension is 25 to 45 mN/m.

(4) The water based ink composition for a ballpoint pen as described in any of the above items (1) to (3), wherein the cobalt phthalocyanine blue has a particle diameter of 500 nm or less.

(5) A ballpoint pen charged with the water based ink composition for a ballpoint pen as described in any of the above items (1) to (4).

(6) The ballpoint pen as described in the above item (5), wherein a pen tip is a ballpoint pen tip, and at least a part of said ballpoint pen tip is composed of a metal material.

(7) The ballpoint pen as described in the above item (5) or (6), wherein the color of the ink in an ink tank can visually be observed from the outside.

BEST MODE FOR CARRYING OUT THE INVENTION

Cobalt phthalocyanine blue which is used for the water based ink composition for a ballpoint pen of the present invention is a compound prepared by changing a coordinated metal of copper phthalocyanine blue to cobalt (for example, C. I. 74160: 2, CAS No. 3317-67-7 and the like).

The cobalt phthalocyanine blue described above has preferably a particle diameter of 500 nm or less, more preferably 300 nm or less. If the particle diameter is 500 nm or less, the dispersion stability is excellent, and the stability with the passage of time as an ink for writing instrument is excellent.

The cobalt phthalocyanine blue in the ink composition of the present invention has a content of 0.05 to 30% by weight, and it falls preferably in a range of 3.0 to 15.0% by weight, more preferably 5.0 to 10.0% by weight. If the blending amount is less than 0.05% by weight, coloring becomes weak, and the hue of the ink is not distinguishable in a certain case when written on paper. On the other hand, if the blending amount exceeds 30%, a pigment is coagulated in storing over a long period of time to clog the pen tip, so that inferior writing is brought about in a certain case.

The cobalt phthalocyanine blue described above which is used as a colorant in the ink composition of the present invention does not have to particularly use other colorants, because an ink color in an ink tank can visually be observed to be the same color as that of drawn lines when the ink is filled into a ballpoint pen tank in which the ink in the ink tank can be observed from the outside, but water soluble dyes can be used as well in combination in order to diversify the color of drawn lines.

Any of direct dyes, acid dyes, food colors and basic dyes can be used for the water-soluble dyes.

Examples of the direct dyes include C. I. Direct Black 17, ditto 19, ditto 22, ditto 32, ditto 38, ditto 51 and ditto 71, C. I. Direct Yellow 4, ditto 26, ditto 44 and ditto 50, C. I. Direct Red 1, ditto 4, ditto 23, ditto 31, ditto 37, ditto 39, ditto 75, ditto 80, ditto 81, ditto 83, ditto 225, ditto 226 and ditto 227, C. I. Direct Blue 1, ditto 15, ditto 71, ditto 86, ditto 106 and ditto 119.

Examples of the acid dyes include C. I. Acid Black 1, ditto 2, ditto 24, ditto 26, ditto 31, ditto 52, ditto 107, ditto 109, ditto 110, ditto 119 and ditto 154, C. I. Acid Yellow 7, ditto 17, ditto 19, ditto 23, ditto 25, ditto 29, ditto 38, ditto 42, ditto 49, ditto 61, ditto and ditto 142, C. I. Acid Red 8, ditto 9, ditto 14, ditto 18, ditto 26, ditto 27, ditto 35, ditto 37, ditto 51, ditto 52, ditto 57, ditto 82, ditto 87, ditto 92, ditto 94, ditto 111, ditto 129, ditto 131, ditto 138, ditto 186, ditto 249, ditto 254, ditto 265 and ditto 276, C. I. Acid Violet 15 and ditto 17, C. I. Acid Blue 1, ditto 7, ditto 9, ditto 15, ditto 22, ditto 23, ditto 25, ditto 40, ditto 41, ditto 43, ditto 62, ditto 78, ditto 83, ditto 90, ditto 93, ditto 103, ditto 112, ditto 113, and ditto 158, C. I. Acid Green 3, ditto 9, ditto 16, ditto 25 and ditto 27.

A large part of the food colors is included in the direct dyes and the acid dyes, and examples of those which are not included therein include, for example, C. I. Food Yellow 3. Such dye can be used as the colorant of the present invention.

Examples of the basic dyes include, for example, C. I. Basic Yellow 1, ditto 2 and ditto 21, C. I. Basic Orange 2, ditto 14 and ditto 32, C. I. Basic Red 1, ditto 2, ditto 9 and ditto 14, C. I. Basic Violet 1, ditto 3 and ditto 7, C. I. Basic Green 4, C. I. Basic Brown 12, C. I. Basic Black 2 and ditto 8.

The water soluble dyes described above each may be used alone or in combination of two or more kinds thereof. A blending amount thereof falls usually in a range of 0.05 to 30% by weight, preferably 1 to 15% by weight based on the total amount of the composition. If a blending amount of the colorant (water soluble dye) exceeds 30% by weight, the dye is deposited to clog the pen tip when stored over a long period of time, so that inferior writing is caused in a certain case. On the other hand, the blending amount of less than 0.05% by weight makes coloring poor and makes it impossible in a certain case to recognize a change in the hue when written on paper.

Since cobalt phthalocyanine blue is used as a colorant for the ink composition of the present invention, a dispersant has to be used. The dispersant has action to adsorb on the surface of pigment particles to disperse the pigment in water, and capable of being usually used are nonionic or anionic surfactants, water-soluble polymers and the like, which are shown below.

Examples of the nonionic surfactants include polyoxyalkylene higher fatty acid esters, higher fatty acid esters of polyhydric alcohols and derivatives thereof, and higher fatty acid esters of sugars. To be more specific, capable of being given are, for example, glycerin fatty acid esters, polyglycerin fatty acid esters, propylene glycol fatty acid esters, pentaerythritol fatty acid esters, polyoxyethylene sorbitan fatty acid esters, polyoxyethylene sorbit fatty acid esters, polyoxyethylene glycerin fatty acid esters, polyethylene glycol fatty acid esters, polyoxyethylene alkyl ethers, polyoxyethylene phytosterols, polyoxyethylene polyoxypropylene alkyl ethers, polyoxyethylene alkylphenyl ethers, polyoxyethylene castor oil, polyoxyethylene lanolin, polyoxyethylene lanolin alcohols, polyoxyethylene alkylamines, polyoxyethylene fatty acid amides and polyoxyethylene alkylphenyl formaldehyde condensation products.

Examples of the anionic surfactants include salts of alkyl sulfonic acid of higher fatty acid amides and salts of alkylarylsulfonic acid. To be more specific, capable of being given are, for example, salts of alkylsulfates, polyoxyethylene alkyl ether sulfates, salts of N-acylamino acid, salts of N-acylmethyltaurine, salts of polyoxyethylene alkyl ether acetates, salts of alkylphosphates and phosphoric acid esters and salts thereof.

Examples of the water soluble polymer which is used as a dispersion include polyacrylic acids, acrylic acid copolymers and maleic acid resins. To be more specific, capable of being given are, for example, those obtained by turning resins such as an acrylic acid resin, a styrene-acrylic acid resin and a styrene-maleic acid resin into salt forms to be water soluble. Alkali metals for forming the salts described above include, for example, sodium and potassium. Capable of being given as the amines are, for example, aliphatic primary to tertiary amines such as mono-, di- or trimethylamine and alcoholamines such as mono-, di- or tripropanolamine, methylethanolamine, methylpropanolamine and dimethylethanolamine. In addition thereto, ammonia, morpholine and N-methylmorpholine can be given.

When using the dispersant, a blending amount thereof is preferably 0.1 to 10% by weight based on the total amount of the composition.

A blending amount of water in the ink composition of the present invention shall not specifically be restricted and is preferably 40 to 90% by weight based on the total amount of the composition. The blending amout of less than 40% by weight results in a relatively high content of the solvent and the colorant and therefore makes the ink less liable to be volatilized, so that the ink is less liable to be dried in a certain case when written on paper. On the other hand, if the blending amount exceeds 90% by weight, the ink is liable to be volatilized, and the pen tip is dried, so that inferior writing is brought about in certain case.

The ink composition of the present invention can be blended with a moisture-holding agent in order to prevent drying of the pen tip. Moisture-holding agent includes, for example, urea, thiourea, pullulan, dextrin, maltodextrin, and the water-soluble solvent which has a comparatively high boiling point includes, for example, water soluble polyhydric alcohols such as ethylene glycol, propylene glycol and glycerin, cellosolves such as ethylene glycol monomethyl ether (methyl cellosolve) and ethylene glycol monoethyl ether (ethyl cellosolve), carbitols such as diethylene glycol monomethyl ether (methyl calbitol) and diethylene glycol monoethyl ether (ethyl carbitol) and glycol ether esters such as ethylene glycol monoethyl ether acetate. The moisture-holding agent may be used alone or in a mixture of two or more kinds thereof. A content thereof can suitably be selected from a range of usually 50% by weight or less, preferably 5 to 50% by weight based on the total amount of the composition. If the blending amount is less than 5% by weight, a purpose for blending which is to prevent drying of the pen tip is not sufficiently achieved in a certain case, and if it exceeds 50% by weight, the ink strikes through, and the drawn lines are less liable to be dried in a certain case.

In addition to the components described above, capable of being blended, if necessary, are components such as, for example, lubricants, preservatives, pH controlling agents, thickeners, corrosion inhibitors and resin emulsions.

Capable of being given as the lubricants are, for example, salts of fatty acids such as potassium linoleate, sodium ricinoleate, potassium oleate and sodium oleate and in addition thereto, the preceding surfactants given as the dispersants.

Capable of being given as the preservatives are, for example, phenol, isopropylmethylphenol, sodium pentachlorophenol, benzoic acid, sodium benzoate, dehydroacetic acid, sodium dehydroacetate, sorbic acid, potassium sorbate, sodium salt of 2-pyridinethiol-1-oxide, 1,2-benzisothiazoline-3-one, 5-chloro-2-methyl-4-isothiazoline-3-one, 2,4-thiazolinebenzimidazole and esters of paraoxybenzoic acid.

Capable of being given as the pH controlling agents are amines or bases, for example, various amines such as aminomethylpropanol, triethanolamine, monoethanolamine and diethanolamine, inorganic alkali agents of alkali metal hydroxides such as sodium hydroxide, lithium hydroxide and potassium hydroxide, and ammonia.

The thickeners are classified roughly into organic thickeners and inorganic thickeners, and acryl base synthetic polymers, natural gums, celluloses and polysaccharides can be used as the organic thickeners. To be more specific, they include, for example, natural thickeners such as gum arabic, tragacanth gum, guar gum, locust bean gum, alginic acid, carrageenan, gelatin, casein, xanthan gum and dextran, semi-synthetic thickeners such as methyl cellulose, ethyl cellulose, hydroxyethyl cellulose, carboxymethyl cellulose, starch sodium glycolate and alginic acid propylene glycol esters and synthetic thickeners such as polyvinyl alcohol, polyvinylpyrrolidone, polyvinyl methyl ether, polysodium acrylate, carboxyvinyl polymers, polyethylene oxides, copolymers of vinyl acetate and polyvinylpyrrolidone, cross-linking type acrylic acid polymer and salts of styrene-acrylic acid copolymers. The inorganic thickeners include, for example, fine particles of clays such as smectite, bentonite and diatomaceous earth and silicon dioxide.

A blending amount of these thickeners shall suitably be increased or decreased depending on a viscosity value of the ink.

The corrosion inhibitors include, for example, tolyl triazole, benzotriazole and derivatives thereof, derivatives of phosphoric acid and thiophosphoric acid such as octyl phosphate and dioctyl thiophosphate, imidazole, benzimidazole and derivatives thereof, 2-mercaptobenzothiazole, octyl methanesulfonate, dicyclohexylammonium nitrite, diisopropylammonium.nitrite, propargyl alcohol and dialkylthiourea.

The resin emulsion is blended expecting a function as principally a viscosity-controlling agent or a visibility-improving agent from opaqueness thereof and includes, for example, polyvinyl chloride, polyvinylidene chloride, polystyrene, polyethylene, polycarbonate, polymethyl methacrylate, benzoquanamine resins, styrene-acrylonitrile copolymers, alkyl acrylate copolymers, acrylonitrile-alkyl acrylate copolymers, styrene-alkyl acrylate copolymers, styrene-alkyl methacrylate copolymers, styrene-alkyl methacrylate-alkyl acrylate copolymers, styrene-acrylonitrile-alkyl acylate copolymers, styrene-acrylonitrile-alkyl methacrylate-alkyl acrylate copolymers, alkyl methacrylate-alkyl acrylate copolymers, acrylic acid-methacrylic acid-alkyl acrylate copolymers and vinylidene chloride-alkyl acrylate copolymers.

In the ink composition of the present invention, the pH has to be controlled to 7 to 10 (measuring temperature: 25° C., measuring instrument: a pH meter manufactured by Horiba, Ltd.). The pH is controlled to the range descried above in order to prevent the metal ballpoint pen tip from rusting and prevent the dispersant used for dispersing the pigment from coagulating. Usually, a tip of a ballpoint pen is composed of a ball and a holder, and it is necessary to consider preventing rust if metal is used even partially to compose them. In the case of a water based ink as is the case with the present invention, a countermeasure for preventing rust is an essential requisite. For example, when conventional tungsten carbide is used for a ballpoint tip material, an adverse effect on the writing performance caused by dissolution of cobalt or tungsten is not brought about if the pH falls in the range described above. Accordingly, the above range is preferred.

In particular, when a dispersant of an alkali-dissolving type (an example: styrene acrylic acid resin ammonium salt) is used for preventing the dispersant from coagulating, the effects thereof can sufficiently be exhibited by controlling the pH to the range described above, and therefore the range is preferred.

A viscosity of the ink composition of the present invention can be selected from a wide range, and it is controlled preferably to a range of 1 to 10 mPa·s (measuring temperature: 25° C., measuring instrument: an ELD type viscometer manufactured by Tokyo Keiki Co., Ltd.). A viscosity of the ink composition can be controlled by, for example, the blending amounts of a water-soluble solvent, a resin emulsion and a thickener.

A surface tension of the ink composition of the present invention is suitably set preferably in a range of about 16 to about 45 mN/m (measuring temperature: 25° C., measuring instrument: a surface tension measuring meter manufactured by Kyowa Interface science Co., Ltd.). For example, when the ink composition of the present invention is used for a ballpoint pen of a collector-mounted ink direct-storage free ink type, which shall be described later, as a low viscosity ink having a viscosity of not much more than 1 to 10 mPa·s (25° C.), a surface tension of the ink is controlled preferably to about 35 to about 45 mN/m, more preferably about 37 to about 42 mN/m and desirably about 38 to about 40 mN/m in order to maintain the quality of the ballpoint pen. Also, when it is used for a ballpoint pen of a sliver system having the same viscosity, which shall be described later, a surface tension of the ink is controlled preferably to about 25 to about 40 mN/m, more preferably about 27 to about 38 mN/m and desirably about 30 to about 36 mN/m in order to maintain the quality of the ballpoint pen. If the surface tensions of the inks are lower than the preferred ranges described above respectively in the ballpoint pens of the above respective types, the drawn lines are liable to cause feathering, and adverse effects (leakage, seepage and the like) are exerted on a quality of the ballpoint pens in a certain case. On the other hand, if the surface tensions exceed the preferred ranges described above respectively, writing feeling and flow amount stability of the ballpoint pens are reduced in a certain case.

On the other hand, when the ink composition of the present invention is provided with pseudo-plasticity to prepare an intermediate viscosity ink having a viscosity of not much more than 100 to 4000 mPa·s (25° C.) at a shearing rate of 3.84s$^{-1}$, a surface tension thereof is controlled so as to be preferably in a range of about 16 to about 38 mN/m, more preferably about 17 to about 35 mN/m and desirably about 20 to about 33 mN/m. If the surface tension is less than 16 mN/m, a leakage phenomenon is liable to be caused, and coagulation and settling of the pigment are liable to be brought about. On the other hand, if it exceeds 38 mN/m, a blobbing phenomenon and a splitting phenomenon are liable to be caused. Further, a discharge amount of the ink turns instable depending on a storing environment and a writing condition, and scattering in a density and a width of the drawn lines is liable to be brought about in a certain case.

The ink composition of the present invention can be produced by stirring and mixing the components described above according to a conventional method.

Capable of being employed as the preferred embodiment of the ballpoint pen of the present invention is a structure comprising an ink reservoir containing the ink composition described above, a tip holder comprising a material such as stainless steel, brass, German silver and a thermoplastic resin (molded article) and a pen tip having a ball comprising a material such as sintered hard alloy (for example, tungsten carbide), zirconia and silicon carbide.

The water based ink composition of the present invention is suitably used for a ballpoint pen of a sliver system and a ballpoint pen of a free ink type in which an ink is stored directly in the ballpoint pen. In particular, in the case of the ballpoint pen of a free ink type, usually employed is a mechanism in which a transparent material (example: polypropylene) is used for an ink tank part so that users can observe an ink remaining volume. The water based ink composition for a ballpoint pen of the present invention has the advantage that users can easily observe the ink color, since an apparent ink color and a drawn line color can be observed to be equal.

The ballpoint pen of a sliver system is a ballpoint pen constituted from a barrel housing therein a sliver which occludes the ink of the present invention described above, a feed comprising a fiber bundle which is connected to the sliver and a pen tip comprising a ball and a tip holder. The ballpoint pen of a free ink type includes two kinds. The ballpoint pen of a collector-mounted ink direct-storage free ink type is constituted of an ink tank in which an ink is directly stored, an ink-holding member (collector) in which the ink forced out from the ink tank when air contained in the ink tank is expanded by a rise in the temperature is temporarily held so that the ink is prevented from blobbing from a pen tip and air hole, and a pen tip comprising a ball and a tip holder. The ballpoint pen of an ink direct-storage free ink type is a ballpoint pen constituted of a tube in which the ink is directly stored and a pen tip comprising a ball and a tip holder.

The ballpoint pens shown above are classified by the ink viscosity ranges described above and used. For example, the ink having an ink viscosity of 1 to 10 mPa·s (25° C.) is suitably used for a ballpoint pen of a silver system or a collector-mounted ink direct-storage free ink type. The ink having a viscosity of not much more than 100 to 4000 mPa·s at a shearing rate of 3.84 s$^{-1}$ is suitably used principally for a ballpoint pen of an ink direct-storage free ink type.

It is a matter of course that the ink composition of the present invention can be applied to ballpoint pens using a water based ink other than those described above.

EXAMPLES

Next, the present invention shall more specifically be explained with reference to examples, but the present invention shall by no means be restricted by them.

Example 1

The following respective components were stirred and mixed for 3 hours by means of a stirrer and then dispersed for 5 hours by means of a sand mill, and further, coarse particles were removed by means of a centrifugal separator, whereby a navy blue water based pigment ink for a ballpoint pen was prepared.

| Components | blending amount: % by weight |
|---|---|
| Pigment: cobalt phthalocyanine blue (Pigment Blue 75: manufactured by Dainichiseika Color & Chemicals MFG. Co., Ltd.) | 8.0 |
| Solvent: glycerin | 8.0 |
| Solvent: propylene glycol | 1.0 |
| Solvent: diethylene glycol | 8.0 |
| Dispersant: styrene-acrylic acid resin ammonium salt | 3.0 |
| Lubricant: nonionic surfactant (Scourol 700: manufactured by Kao Corporation) | 0.1 |
| pH controlling agent: aminomethylpropanol | 0.2 |
| Preservative: 1,2-benzisothiazoline-3-one (Proxel BDN: manufactured by Zeneca Co., Ltd.) | 0.1 |
| Rust preventive: benzotriazole | 0.1 |
| Purified water | balance |

Comparative Example 1

A navy blue water based ink for a ballpoint pen was prepared in the same manner as in Example 1, except that cobalt aluminum oxide was substituted for cobalt phthalocyanine blue.

Comparative Example 2

A navy blue water based ink for a ballpoint pen was prepared in the same manner as in Example 1, except that a blending amount of aminomethylpropanol was increased to 0.5% by weight.

Example 2

A navy blue water based pigment ink for a ballpoint pen was prepared by the same manner as in Example 1 according to the following recipe.

| Components | blending amount: % by weight |
|---|---|
| Pigment: cobalt phthalocyanine blue (Pigment Blue 75: manufactured by Dainichiseika Color & Chemicals MFG. Co., Ltd.) | 8.0 |
| Solvent: glycerin | 4.0 |
| Solvent: propylene glycol | 6.0 |
| Solvent: diethylene glycol | 6.0 |
| Dispersant: styrene-acrylic acid resin ammonium salt | 3.0 |
| Lubricant: nonionic surfactant (Scourol 700: manufactured by Kao Corporation) | 0.5 |
| pH controlling agent: aminomethylpropanol | 0.2 |
| Preservative: 1,2-benzisothiazoline-3-one (Proxel BDN: manufactured by Zeneca Co., Ltd.) | 0.1 |
| Rust preventive: benzotriazole | 0.1 |
| Purified water | balance |

Comparative Example 3

A navy blue water based ink for a ballpoint pen was prepared in the same manner as in Example 2, except that the following colorants were substituted for cobalt phthalocyanine blue.

| Colorant: carbon black (Carbon Black MA 100: manufactured by Mitsubishi Chemicals Corporation) | 1.0 |
|---|---|
| Colorant: copper phthalocyanine blue (Chromofine Blue 4965: manufactured by Dainichiseika Color & Chemicals MFG. Co., Ltd.) | 7.0 |

Example 3

A navy blue water based pigment ink for a ballpoint pen was prepared by the same manner Example 1 according to the following receipe

| Components | blending amount: % by weight |
|---|---|
| Pigment: cobalt phthalocyanine blue (Pigment Blue 75: manufactured by Dainichiseika Color & Chemicals MFG. Co., Ltd.) | 8.0 |
| Solvent: glycerin | 4.0 |
| Solvent: ethylene glycol | 20.0 |
| Dispersant: styrene-acrylic acid resin ammonium salt | 3.0 |
| Lubricant: nonionic surfactant (Scourol 700: manufactured by Kao Corporation) | 1.0 |
| pH controlling agent: aminomethylpropanol | 0.5 |
| Thickener: acryl base synthetic high polymer | 0.4 |
| Preservative: 1,2-benzisothiazoline-3-one (Proxel BDN: manufactured by Zeneca Co., Ltd.) | 0.1 |
| Rust preventive: benzotriazole | 0.2 |
| Purified water | balance |

Comparative Example 4

A navy blue water based ink for a ballpoint pen was prepared in the same manner as in Example 1, except that Prussian blue was substituted for cobalt phthalocyanine blue.

Test Example

The inks obtained in the examples and comparative examples each described above were evaluated according to the following visibility test, abrasion resistance test and stability test with the passage of time. The results thereof are shown in Table 1.

Visibility Test:

Ballpoint pens of the following specifications were charged with the inks prepared in the examples and comparative examples and assembled.

(1) Collector-mounted ink direct-storage free ink type ballpoint pen
  (ball diameter: φ0.5)

Example 1

Comparative Examples 1 and 2

(2) Sliver system ballpoint pen (ball diameter: φ0.5)

Example 2

Comparative Example 3

(3) Ink direct-storage free ink type ballpoint pen (ball diameter: φ0.5)

Example 3

Comparative Example 4

Then, an appearance color of the ink and a hue of the drawn line color were evaluated according to the following criteria.

<Judgement Criteria>:
○: appearance color is the same as drawn line color
X: drawn line color is pale as compared with appearance color (Abrasion Resistance Test):

Five ballpoint pens of the specifications (1) to (3) described above were assembled using the respective inks prepared in the examples and the comparative examples to carry out mechanical writing under the following condition to measure the values of ball sinking.

Evaluation temperature and humidity: 25° C., 60%
Writing speed: 4.5 m/min.
Writing angle: 60°
Writing load: 100 g
Writing distance: 1200 m (Pen Quality Stability Test With the Passage of Time):

The ballpoint pens of the specifications (1) to (3) described above were assembled using the respective inks prepared in the examples and comparative examples and left standing for 3 months at 50° C. with the pens turned downward, and then the pen performances were confirmed.

<Judgement Criteria>:

○: both of drawn line quality and pen body quality have no problem
Δ: hue of drawn lines is changed
X: pen tip is clogged with pigment to make writing impossible
※: writing feeling is reduced by ball corrosion

TABLE 1

|  | Ink physical property | | | Abrasion resistance test | |
|---|---|---|---|---|---|
|  | pH | Viscosity (mPa · s) | Surface tension (mN/s) | Visibility test Hue | Ball sinking (μ) | Stability test with the passage of time |
| Example 1 | 8.5 | 3.2 | 40.5 | ○ | 21 | ○ |
| Example 2 | 8.3 | 3.2 | 34.4 | ○ | 13 | ○ |
| Example 3 | 8.5 | 755 | 32.7 | ○ | 8 | ○ |
| Comparative Example 1 | 8.3 | 5.2 | 40.0 | X | 52 | X |
| Comparative Example 2 | 10.5 | 3.2 | 39.9 | ○ | 23 | ※ |
| Comparative Example 3 | 8.3 | 3.2 | 35.0 | ○ | 12 | Δ |
| Comparative Example 4 | 8.5 | 921 | 33.0 | X | 40 | X |

(The viscosities of Example 3 and Comparative Example 4 are values measured at a shear rate of 3.84 s$^{-1}$)

INDUSTRIAL APPLICABILITY

In the water based ink composition for a ballpoint pen of the present invention, an ink color in an ink tank and a drawn line color can visually be observed as almost the same color by using cobalt phthalocyanine blue as a colorant when the ink is filled into a ballpoint pen tank in which the ink in the ink tank can visually be observed from the outside. Further, this water based ink for a ballpoint pen is not changed in an ink composition even in storing over a long period of time and is excellent in lubricity. It can be endowed with a high fastness level which is the characteristic of a pigment and can suitably be applied to ballpoint pens of a collector-mounted ink direct-storage free ink type, an ink direct-storage free ink type, and a silver system.

What is claimed is:

1. A water based ink composition for a navy blue ballpoint pen comprising a colorant, water and a dispersant, wherein at least cobalt phthalocyanine blue is used as the colorant, and the pH is controlled to a range of 7 to 10.

2. The water based ink composition for a ballpoint pen as described in claim 1, wherein a blending amount of the cobalt phthalocyanine blue is 0.05 to 30% by weight based on the total amount of the composition.

3. The water based ink composition for a ballpoint pen as described in claim 1, wherein the ink composition has a viscosity of 1 to 10 mPa·s (25° C.), and a surface tension of 25 to 45 mN/m.

4. The water based ink composition for a ballpoint pen as described in any of claim 2, wherein the ink composition has a viscosity of 1 to 10 mpa·s (25° C.) and a surface tension of 25 to 45 mN/m.

5. The water based ink composition for a ballpoint pen as described in claim 1, wherein the cobalt phthalocyanine blue has a particle diameter of 500 nm or less.

6. The water based ink composition for a ballpoint pen as described in claim 2, wherein the cobalt phthalocyanine blue has a particle diameter of 500 nm or less.

7. The water based ink composition for a ballpoint pen as described in claim 3, wherein the cobalt phthalocyanine blue has a particle diameter of 500 nm or less.

8. The water based ink composition for a ballpoint pen as described in claim 4, wherein the cobalt phthalocyanine blue has a particle diameter of 500 nm or less.

9. A ballpoint pen charged with the water based ink composition for a ballpoint pen as described in claim 1.

10. A ballpoint pen charged with the water based ink composition for a ballpoint pen as described in claim 2.

11. A ballpoint pen charged with the water based ink composition for a ballpoint pen as described in claim 10.

12. A ballpoint pen charged with the water based ink composition for a ballpoint pen as described in claim 4.

13. A ballpoint pen charged with the water based ink composition for a ballpoint pen as described in claim 5.

14. A ballpoint pen charged with the water based ink composition for a ballpoint pen as described in claim 6.

15. A ballpoint pen charged with the water based ink composition for a ballpoint pen as described in claim 7.

16. A ballpoint pen charged with the water based ink composition for a ballpoint pen as described in claim 8.

17. The ballpoint pen as described in claim 9, wherein a pen tip is a ballpoint pen tip, and at least a part of said ballpoint pen tip is composed of a metal material.

18. The ballpoint pen as described in claim 10, wherein a pen tip is a ballpoint pen tip, and at least a part of said ballpoint pen tip is composed of a metal material.

19. The ballpoint pen as described in claim 11, wherein a pen tip is a ballpoint pen tip, and at least a part of said ballpoint pen tip is composed of a metal material.

20. The ballpoint pen as described in claim 12, wherein a pen tip is a ballpoint pen tip, and at least a part of said ballpoint pen tip is composed of a metal material.

21. The ballpoint pen as described in claim 13, wherein a pen tip is a ballpoint pen tip, and at least a part of said ballpoint pen tip is composed of a metal material.

22. The ballpoint pen as described in claim 14, wherein a pen tip is a ballpoint pen tip, and at least a part of said ballpoint pen tip is composed of a metal material.

23. The ballpoint pen as described in claim 15, wherein a pen tip is a ballpoint pen tip, and at least a part of said ballpoint pen tip is composed of a metal material.

24. The ballpoint pen as described in claim 16, wherein a pen tip is a ballpoint pen tip, and at least a part of said ballpoint pen tip is composed of a metal material.

25. The ballpoint pen as described in claim 9, wherein the color of the ink in the ink tank can visually be observed from the outside.

26. The ballpoint pen as described in claim 10, wherein the color of the ink in the ink tank can visually be observed from the outside.

27. The ballpoint pen as described in claim 11, wherein the color of the ink in the ink tank can visually be observed from the outside.

28. The ballpoint pen as described in claim 12, wherein the color of the ink in the ink tank can visually be observed from the outside.

29. The ballpoint pen as described in claim 13, wherein the color of the ink in the ink tank can visually be observed from the outside.

30. The ballpoint pen as described in claim 14, wherein the color of the ink in the ink tank can visually be observed from the outside.

31. The ballpoint pen as described in claim 15, wherein the color of the ink in the ink tank can visually be observed from the outside.

32. The ballpoint pen as described in claim 16, wherein the color of the ink in the ink tank can visually be observed from the outside.

33. The ballpoint pen as described in claim 17, wherein the color of the ink in the ink tank can visually be observed from the outside.

34. The ballpoint pen as described in claim 18, wherein the color of the ink in the ink tank can visually be observed from the outside.

35. The ballpoint pen as described in claim 19, wherein the color of the ink in the ink tank can visually be observed from the outside.

36. The ballpoint pen as described in claim 20, wherein the color of the ink in the ink tank can visually be observed from the outside.

37. The ballpoint pen as described in claim 21, wherein the color of the ink in the ink tank can visually be observed from the outside.

38. The ballpoint pen as described in claim 22, wherein the color of the ink in the ink tank can visually be observed from the outside.

39. The ballpoint pen as described in claim 23, wherein the color of the ink in the ink tank can visually be observed from the outside.

40. The ballpoint pen as described in claim 24, wherein the color of the ink in the ink tank can visually be observed from the outside.

* * * * *

UNITED STATES PATENT AND TRADEMARK OFFICE
CERTIFICATE OF CORRECTION

PATENT NO. : 6,953,502 B2
DATED : October 11, 2005
INVENTOR(S) : Hideyuki Ikoma

It is certified that error appears in the above-identified patent and that said Letters Patent is hereby corrected as shown below:

Column 11,
Line 67, delete "any of".

Column 12,
Line 1, change "mpa·s" to -- mPa·s --.
Line 43, change "10" to -- 3 --.

Signed and Sealed this

Twenty-eighth Day of March, 2006

JON W. DUDAS
*Director of the United States Patent and Trademark Office*